July 2, 1963  F. E. J. WILSON  3,095,741
LIQUID METERS
Filed Feb. 14, 1961  8 Sheets-Sheet 1

INVENTOR
FREDERICK E. J. WILSON
BY
ATTORNEYS

INVENTOR
FREDERICK E. J. WILSON
BY
*Imirie & Smiley*
ATTORNEYS

INVENTOR
FREDERICK E. J. WILSON
BY
ATTORNEYS

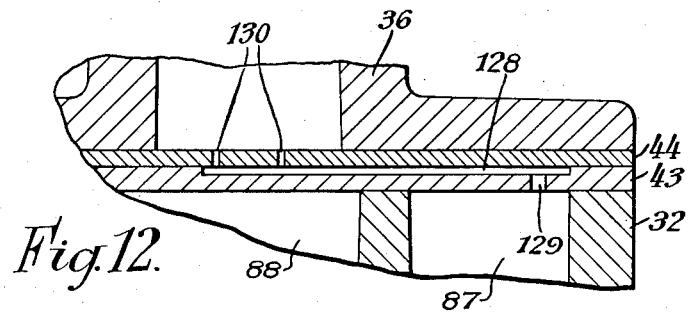
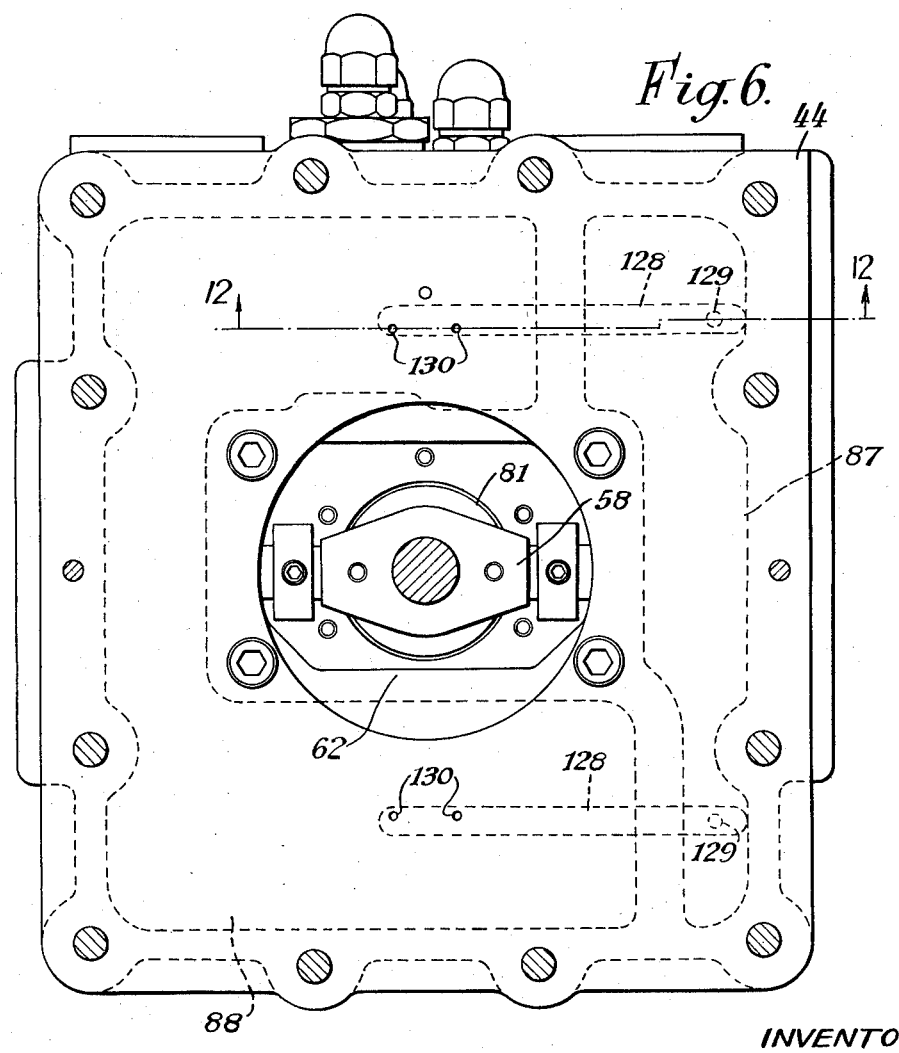

July 2, 1963  F. E. J. WILSON  3,095,741
LIQUID METERS
Filed Feb. 14, 1961  8 Sheets-Sheet 7
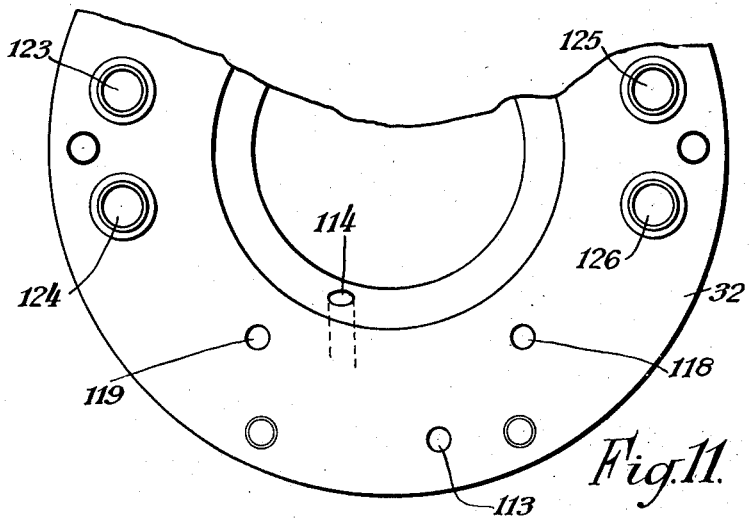
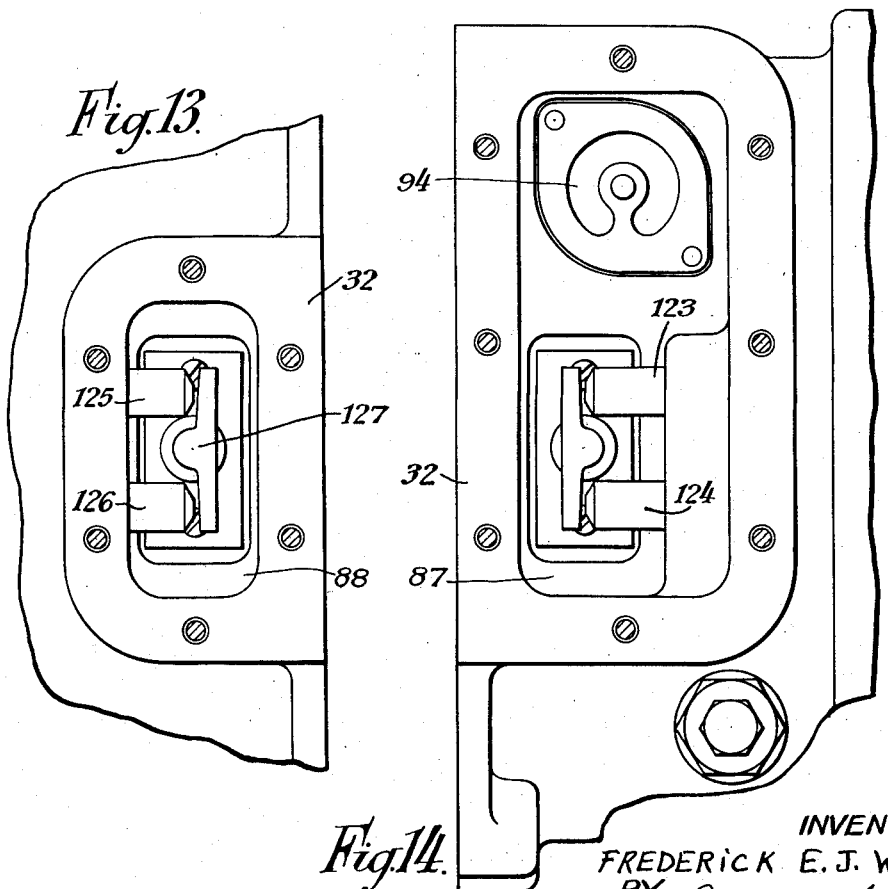
INVENTOR
FREDERICK E. J. WILSON
BY
ATTORNEYS

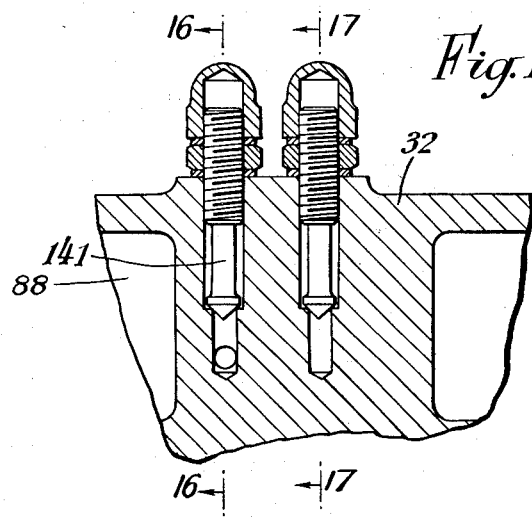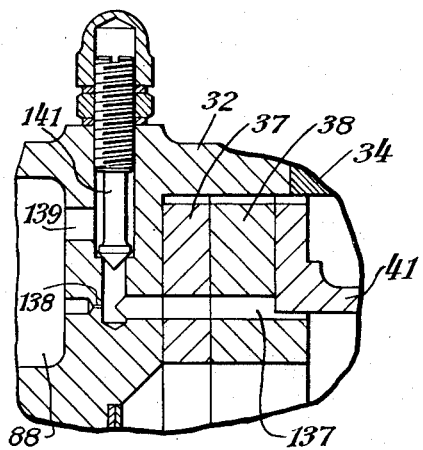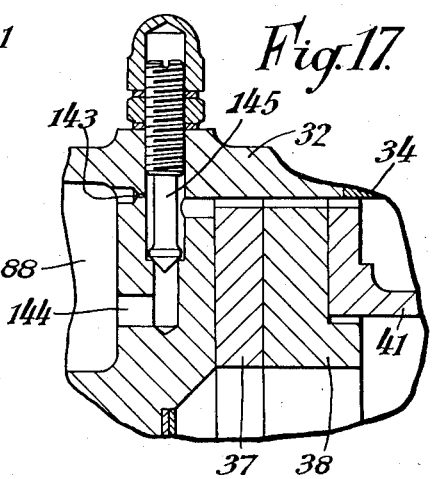

United States Patent Office 3,095,741
Patented July 2, 1963

3,095,741
LIQUID METERS
Frederick Edward John Wilson, Chessington, England, assignor to Avery-Hardoll Limited, Chessington, England
Filed Feb. 14, 1961, Ser. No. 89,187
5 Claims. (Cl. 73—233)

This invention relates to liquid metering devices comprising, in combination with a liquid meter of the displacement type, apparatus for modifying the readings of the said meter so as to provide a measure of the weight of liquid passing through it.

The invention is an improvement in or modification of the liquid metering device described and claimed in our British patent specification No. 857,348.

In the apparatus described in that specification there is described a liquid metering device in which a proportion of the liquid flowing through the metering device was caused to flow through a chamber in which a float was mounted, and the float was caused to move up and down continuously by the shifting to-and-fro of a counterweight, so that its effective buoyancy changed continuously, the float controlling the action of fluid pressure on a piston to shift the counterweight and also to vary the speed ratio of a continuously variable change speed device interposed between the meter and indicating or recording means driven by the said meter. The mean position of the counterweight relative to the float varied with the density of the liquid in the float chamber, since the said counterweight tended to move about a mean position at which the float was just supported by the liquid, and the speed ratio of the continuously variable change speed device therefore also tended to vary about a mean value corresponding to the liquid density.

In one form of the apparatus described in the earlier application the movements of the float controlled obturating means co-operating with orifices through which liquid under pressure entered and left chambers on opposite sides of the piston, so that when the float moved in one direction the flow into one chamber was increased and the flow out of that chamber reduced whilst the flow into the other chamber was reduced and the flow out of the said other chamber increased. Opposite movement of the float produced a corresponding effect but in the opposite sense, so that the relative pressures acting on opposite sides of the piston varied in opposite senses with movements of the float in opposite directions.

Apparatus such as that described in the earlier application depends for its operation on the fact that as the float swings away from a mean position the resulting movement of the piston changes the buoyancy of the float to produce a tendency to swing in the opposite direction, so that the float swings past the mean position and its buoyancy is changed in the opposite direction. The swing is therefore continuous, the mean position of the piston changing with the density of the liquid. It has been found, however, that, owing to friction in the piston and other moving parts, the changes of buoyancy of the float may fail to give a sufficient impetus to the float, and it may tend to stop in or near the mean position, at which the pressure on both sides of the piston are equal or substantially equal, so that there is no force acting to re-start its oscillation until a change in liquid density occurs.

It is the object of the present invention to overcome this difficulty.

According to the present invention, in a liquid metering device according to claim 1 of British patent specification No. 857,348 a pilot valve moved to-and-fro by changes, responsive to movement of the float, of liquid pressure acting thereon, controls the flow of liquid into and out of chambers at opposite ends of the piston to control the to-and-fro movement of said piston.

Preferably a flow restricting device is provided in a conduit through which liquid is supplied to the meter, and branch conduits leading from opposite sides of said flow restricting devices are connected respectively to inlet and outlet chambers in a casing containing said float chamber and a cylinder in which the piston is mounted, two pressure chambers in which liquid pressure acts to urge the pilot valve respectively in opposite directions being each connected to both the inlet and outlet chambers through passages controlled by obturating means moving with the float and arranged simultaneously to increase the pressure in either one of the pressure chambers and reduce the pressure in the other of said pressure chambers, and passages controlled by the pilot valve to connect both ends of the cylinder alternatively to the inlet and outlet chambers.

The pilot valve is preferably a slide valve comprising a spool slidable in a valve bore.

The piston may comprise relatively movable inner and outer members, the inner member moving with the float counterweight and the outer member being connected to the ratio-changing member of the continuously variable change speed device, stop means being provided to limit the relative movement of the two piston members.

The invention is hereinafter described with reference to the accompanying drawings, in which:

FIGURE 6 is an end view of the density responsive means with the float chamber and float removed;

FIGURE 11 is a partial transverse section on the line 11—11 of FIGURE 2;

FIGURE 12 is a partial sectional plan view of the line 12—12 of FIGURE 6;

FIGURE 13 is a partial side elevation, looking in the direction of the arrow 13 in FIGURE 4, a cover plate being removed;

FIGURE 14 is a partial side elevation looking in the direction of the arrow 14 in FIGURE 4, a cover plate being removed;

FIGURE 15 is a partial transverse section on the line 15—15 in FIGURE 2;

FIGURE 16 is a section on the line 16—16 in FIGURE 15; and

FIGURE 17 is a section on the line 17—17 in FIGURE 15.

Figure 1:
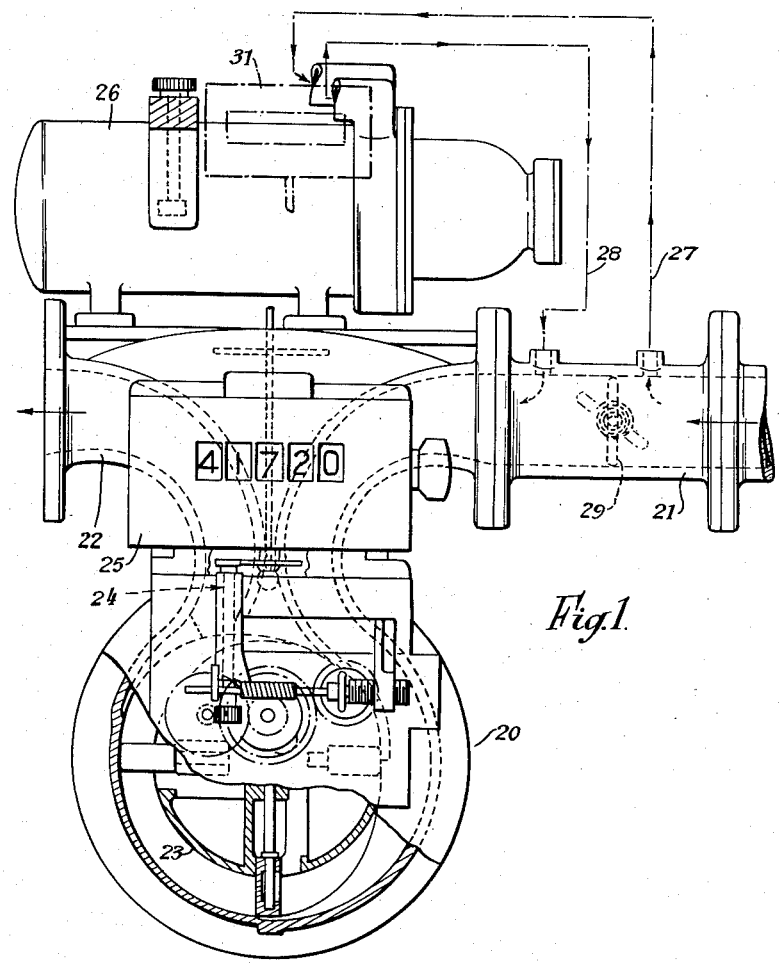
FIGURE 1 is a general view, in elevation, of one form of metering device embodying the present invention.

Referring to FIGURE 1, a displacement meter for liquid is shown at 20, liquid being supplied to the meter through a conduit 21 and leaving the meter through a conduit 22. The meter includes a rotor 23 driven by the liquid passing through the meter and connected by gearing, generally indicated at 24, to a volume indicator 25.

A housing 26 mounted on the meter casing houses density-responsive means, and a proportion of the liquid flowing through the meter 20 is caused to pass through the housing 26, being led into the housing through a conduit 27 having a bore which is small relative to that of the conduit 21, and being returned from the housing through a similar conduit 28, the conduits 27 and 28 joining the conduit 21 at adjacent points between which there is provided a butterfly valve 29 or other device producing some restriction of flow in the conduit 21. A weight indicator is provided at 31 and, as described in specification No. 857,348, is driven by the meter 20 through the gearing 24 and through further gearing the velocity ratio of which is varied by operation of the density-responsive means in the housing 26.

Figure 2:
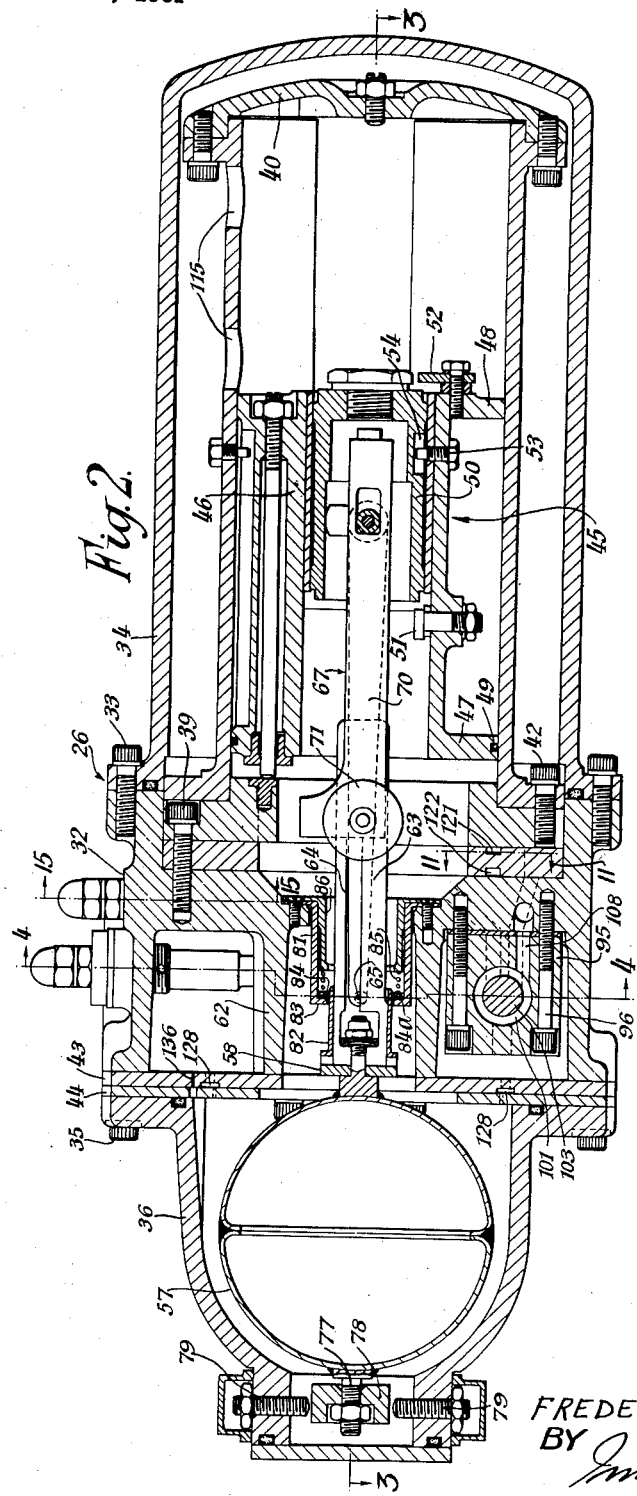
FIGURE 2 is a sectional side elevation of the density-responsive means embodied in the metering device of FIGURE 1.
Figure 3:
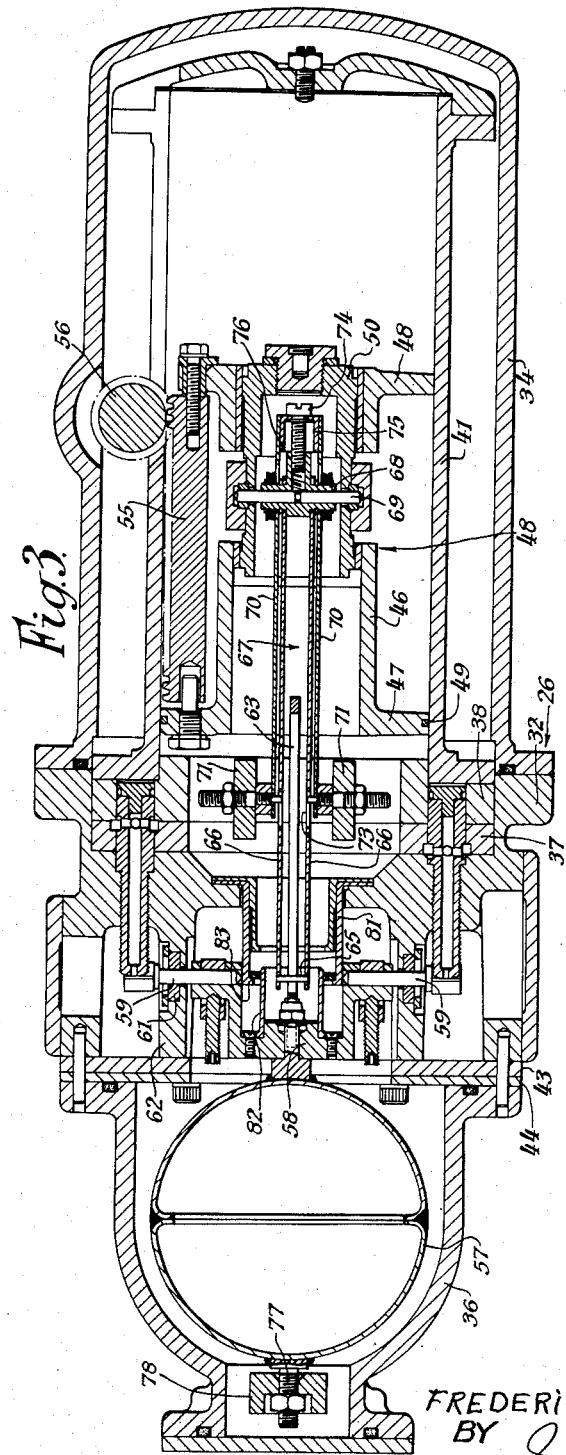
FIGURE 3 is a sectional plan view taken on the line 3—3 of FIGURE 2.

Referring to FIGURES 2 to 17 and particularly to FIGURES 2 and 3, the housing 26 comprises a centre member 32 to one end face of which is secured, by screws 33, a pot 34 and to the other end face of which is secured, by screws 35, a float chamber 36. The end face of the centre member 32 to which the pot 34 is secured is recessed to receive two ring members 37 and 38 held in position by screws 39, and a cylinder 41 is secured to the ring member 38 by screws 42, the cylinder 41 extending inside the pot 34 substantially to the closed end of the latter and being closed at its end remote from the centre member 32 by a cap 40. Two annular plates 43 and 44 are clamped between the other end face of the centre member 32 and the float chamber 36.

A piston 45 is slidably mounted in the cylinder 41, the piston comprising a tubular outer member 46 of smaller diameter than the cylinder and having flanges 47 and 48 at its ends to guide it in the cylinder, the flange 47 carrying a piston ring 49 providing a substantially fluid-tight joint between that flange and the cylinder wall and providing some frictional resistance to sliding motion of the outer piston member 46 in the cylinder 41. An inner piston member 50, slidable in the bore of the outer piston member 46, has its longitudinal movement relative to the outer piston member 46 limited by stops 51 and 52 (FIGURE 2) and is restrained against rotation by a set screw 53 mounted in the outer piston member and extending into a groove 54 in the inner piston member. The outer piston member 46 carries a rack 55 meshing with a pinion 56 mounted in the pot 34 on a suitable shaft which, as described in specification No. 857,348, transmits the motion of the piston outer member 46 to the ratio-changing member of the continuously variable change speed device.

A hollow float 57 in the float chamber 36 is mounted on a cranked yoke 58 the arms of which are fixed to two co-axial pivot pins 59, 59 mounted in bearings 61, 61 in two portions of a partition wall 62 surrounding a generally rectangular recess in the centre of the centre member 32 on the side of the latter facing the float chamber. An arm 63 fixed to the float 57 extends through the centre member 32, the arm 63 being slotted longitudinally, as shown at 64 in FIGURE 2 to receive a pin 65 extending between two spaced bars, 66, 66 forming together another arm 67 pivotally mounted in the inner piston member 50, the bars 66, 66 being fixed to a sleeve 68 mounted on a pivot pin 69. Two additional bars 70, 70 extending alongside the arm 67, each carry a counterweight 71, the bars 70 each being slotted to receive the sleeve 68, and each carrying a pin co-axial with the counterweights and engaging in slots 73 in the bars 66, so that the counterweights move with the arm 67 about the pivot of the latter but are adjustable longitudinally relative to the said arm 67. A screw 74, captive in a bridge-piece 75 extending between the bars 70, 70 and engaging a screw-threaded hole 76 in the sleeve 68, is rotatable to adjust the position of the counter-weights 71 relative to the arm 67. It will be seen that the counterweights 71, acting through the arm 67 and pin 65 on the arm 63, exert a lifting moment on the float 57 which varies with the position of the inner piston member 50 in the cylinder 41.

The float 57 has fixed to it, in alignment with the arm 63 and on the opposite side thereof, a pin 77 on which is mounted a fixed weight 78, and a pair of stop screws 79, 79 mounted in the float chamber co-operate with the weight 78 to limit the range of movement of the float.

The opening in the centre member 32 through which the arm 63 extends is closed to separate the float chamber from the adjacent end of the cylinder 41 by a combination of elements allowing the necessary swinging movement of the float. A sleeve 81, flanged internally at one end and externally at the other, has its external flange secured by screws around the opening in the centre member 32, and a sleeve 82 of smaller diameter, fixed to the yoke 58, extends with clearance through the opening defined by the internal flange 83 on the sleeve 81. A washer 84, fitting closely around the sleeve 82, is pressed against the flange 83 by a coiled spring 85 taking its abutment on a third sleeve 86 fixed to the centre member 32, a second washer 84a being interposed between the washer 84 and the spring 85.

Figure 4:
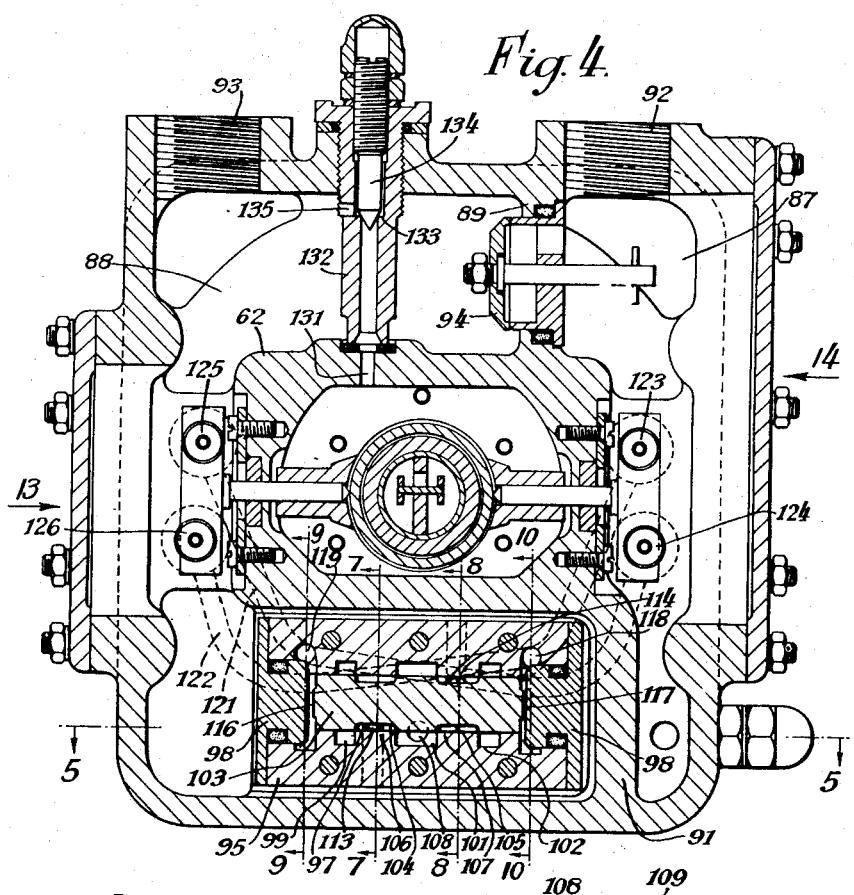
FIGURE 4 is a transverse section on the line 4—4 of FIGURE 2.

The space in the centre member 32 between the wall 62 and the outer wall is divided, as shown in FIGURE 4, into two chambers 87 and 88 by two further walls 89 and 91, the chambers 87 and 88 constituting respectively inlet and outlet chambers to openings 92 and 93 in which the conduits 27 and 28 are connected. A spring-loaded non-return valve 94 controls an opening in the wall 89 to permit direct passage of liquid from the inlet chamber to the outlet chamber if the pressure difference between those chambers exceeds a predetermined limit.

A pilot valve body 95 is mounted in the chamber 88 being secured to the central member 32 by screws 96 (FIGURE 2). The pilot valve body is formed with a cylindrical bore 97, FIGURE 4, closed at its ends by plugs 98. Three circumferential grooves 99, 101, 102 are formed around the bore 97 and a valve spool 103 slidable in the bore is formed with two circumferential grooves 104 and 105 which, when the spool is in a central position are just covered by the lands 106 and 107 in the bore between the grooves 99, 101 and 101, 102 respectively.

Figure 5:
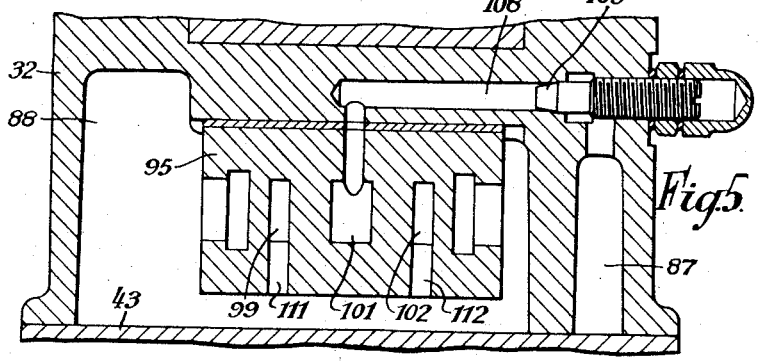
FIGURE 5 is a partial sectional plan on the line 5—5 of FIGURE 4.
Figure 7:
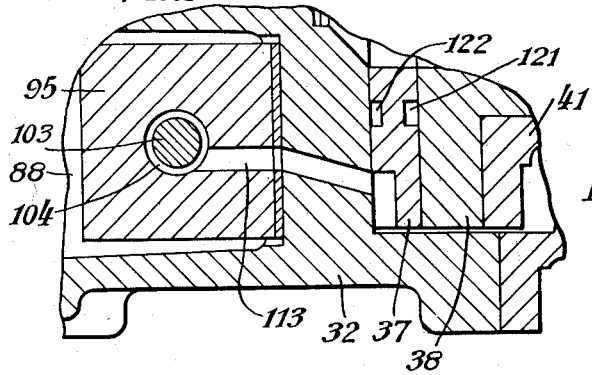
FIGURE 7 is a partial longitudinal section as the line 7—7 of FIGURE 4.
Figure 8:
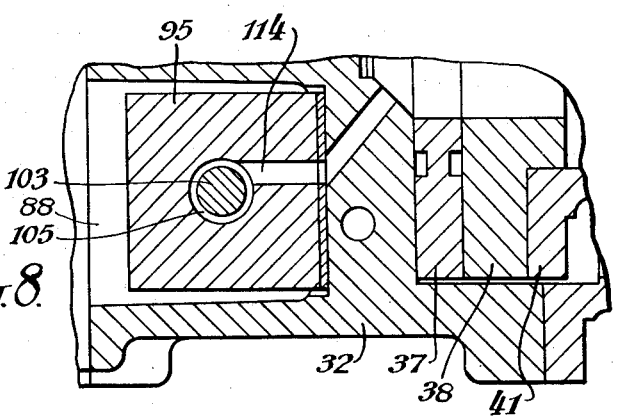
FIGURE 8 is a partial longitudinal section on the line 8—8 of FIGURE 4.

The groove 101 is connected by a passage 108 (FIGURES 2, 4 and 5) to the inlet chamber 87, an adjustable tapered pin 109 being provided in the passage 108, as shown in FIGURE 5, to control flow of liquid in the passage. The grooves 99 and 102 are connected by passages 111 and 112 respectively to the outlet chamber 88, as shown in FIGURE 5. Passages 113 and 114 opening respectively in the lands 106 and 107 are shown respectively in FIGURES 7 and 8, the passage 113 leading into the annular space between the cylinder 41 and the pot 34, and the passage 114 leading into the end of the cylinder 41 adjacent the centre member 32. The cylinder 41 is formed with apertures 115, near its end remote from the centre member 32, which connect that end of the cylinder to the interior of the pot 34.

It will be evident that movement of the valve spool 103 to the left in FIGURE 4 will connect the end of the cylinder 41 adjacent the centre member 32 to the outlet chamber 88 and will connect the other end of the cylinder 41 to the inlet chamber 87, whilst movement of the valve spool in the opposite direction reverses these connections.

Figure 9:
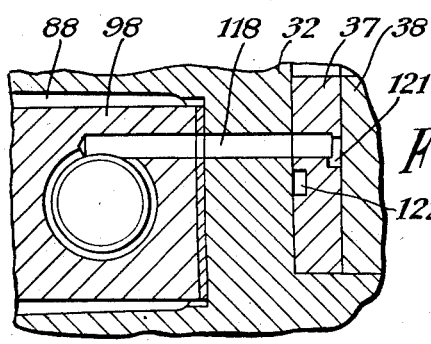
FIGURE 9 is a partial longitudinal section on the line 9—9 of FIGURE 4.
Figure 10:
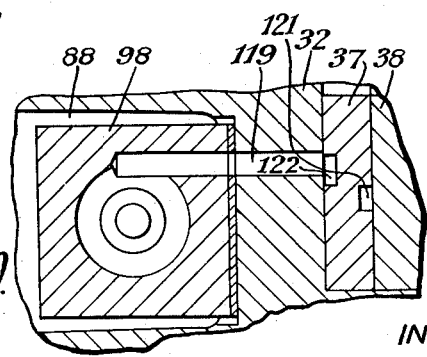
FIGURE 10 is a partial longitudinal section on the line 10—10 of FIGURE 4.

The valve spool 103 is moved to-and-fro in the bore 97 by liquid pressure acting, in chambers 116, 117, on its ends, each chamber being connected to both the inlet and exhaust chambers through passages controlled by obturating means actuated by the float so that when restriction of the connection of one chamber 116 or 117 to the inlet chamber 87 is reduced the restriction of connection of that chamber to the outlet chamber 88 is increased and the other of the chambers 116 and 117 has the restriction of its connection to the outlet chamber 88 reduced and the restriction of its connection to the inlet chamber 87 increased. The chambers 116 and 117 are connected, as shown in FIGURES 9 and 10 respectively, by passages 118 and 119, to grooves 121 and 122 formed in opposite faces of the plate 37, these grooves 121 and 122 being also shown in dotted lines in FIGURE 4. Four nozzles 123, 124, 125 and 126 extend through the plates 37 and 38 and through the centre member 32, the open ends of the nozzles 123 and 124 being in the inlet chamber 87 and the open ends of the nozzles 125 and 126 being in the outlet chamber 88. The nozzles 123 and 126 are connected as shown in FIGURES 3 and 4, to the groove 122, and the nozzles 124 and 125 are similarly connected to the groove 121.

As shown in FIGURES 13 and 14 respectively, the ends of the nozzles 125 and 126 and the ends of the nozzles 123 and 124 lie in a common plane one on each side of the pivot pins 59 for the float, and each of those pivot pins has fixed to it an obturating member 127 which, as the float oscillates to-and-fro about its pivot, first increases the obturation of one nozzle and reduces the obturation of the other, and then increases the obturation of the second nozzle whilst increasing that of the first. Thus, each time the float passes a mean position in its range of movement, the direction of the resultant thrust acting on the valve spool is reversed.

A proportion of the liquid flowing through the housing 26 is caused to flow through the float chamber 36, so that the liquid therein has at all times a density corresponding to that of the main body of liquid then flowing through the meter. The liquid flows to the float chamber 36 through two grooves 128 in the plate 43, these grooves being shown in dotted lines in FIGURE 6, and one of them being shown in section in FIGURE 12. From the latter figure it can be seen that the groove 128 is connected at one end to the inlet chamber 87 by a hole 129 in the plate 43, and at the other end, by two holes 130 in the plate 44, to the float chamber 36. The incoming liquid to the float chamber is thus introduced at a number of points and the setting up of currents which might disturb the action of the float is avoided.

Liquid escapes from the float chamber 36 to the outlet chamber 88 through a passage 131 (FIGURE 4) in the wall 62 and a tubular plug 132, the bore of the plug 132 having formed in it a seat 133 for an adjustable coned needle 134 by means of which the rate of flow of liquid through the float chamber can be controlled. The bore of the plug 132 communicates with the outlet chamber 88 through one or more lateral passages 135.

In order to prevent accumulation of air or gas in the float chamber 36, the cylinder 41 or the pot 34, connections are made from the highest points in these parts to the outlet chamber 88, the connections being highly restricted so as to avoid any substantial flow of liquid through them. The air escape connection from the float chamber 36 is shown at 136 in FIGURE 2. The connection between the cylinder 41 and the outlet chamber 88, as shown in FIGURE 16, comprises a passage 137 leading from the cylinder 41 and connected to the outlet chamber through a constantly-open bleed passage 138 of fine bore, and a larger passage 139, controlled by a needle valve 141. The connection between the pot 34 and the outlet chamber 88, as shown in FIGURE 17, similarly comprises a passage 142 leading from the pot and connected to the outlet chamber through a constantly-open bleed passage 143 of fine bore and a larger passage 144 controlled by a needle valve 145. The needle valves 141 and 145 enable the leakage of liquid through the passages 137 and 142 to be adjusted to control the rate of movement of the piston 45.

The operation of the metering device according to the invention is as follows. Liquid to be measured is pumped through the meter 20, and a proportion of such liquid before reaching the meter, flows through the housing 26. The liquid flowing through the housing 26 maintains the float chamber 36, the cylinder 41, the pot 34 and the inlet and outlet chambers 87 and 88 full of liquid, there being a continuous flow of liquid through the float chamber 36 so that the density of the liquid therein is at all times equal to that of the main body of liquid flowing through the meter 20. The liquid in the float chamber 36 exerts a lifting force on the float 57 which varies with the density of the liquid.

The float 57 oscillates up and down between the stop screws 79, causing the obturators 126, 127 to reverse repeatedly the pressure differential across the spool 103 of the pilot valve, so that the said spool reciprocates in the valve body 95 and repeatedly reverses the connections of the two ends of the cylinder 41 to the inlet and outlet chambers 87 and 88. Assuming, for example, that the float 57 is moving downwardly away from the upper stop screw 79, towards its mean position. Until it reaches the mean position, the chamber 116 in the pilot valve is connected more freely to the inlet chamber 87 than to the outlet chamber 88, and the chamber 117 in the pilot valve is more freely connected to the outlet chamber 88 than to the inlet chamber 87. The valve spool 103 is therefore held in the position shown in FIGURE 4, being displaced to the right, and the inlet chamber 87 is connected, through the passage 108, grooves 101 and 104 and passage 113 to the end of the cylinder 41 remote from the centre member 32. At the same time, the outlet chamber 88 is connected through the passage 112, grooves 102 and 105 and passage 114 to the end of the cylinder 41 adjacent the centre member so that there is a pressure differential across the piston 45 tending to urge it to the left in FIGURE 2 and reduce the effect of the counterweight on the float 57, thus allowing its downward movement. As soon as the float passes the mean position, the pressure differential across the valve spool 103 is reversed, and the said spool moves to the left in FIGURE 4, thus connecting the end of the cylinder 41 adjacent the centre member 32 to the inlet chamber 87, and connecting the other end thereof to the outlet chamber. The pressure differential across the piston 45 is therefore reversed, and it begins to move towards the right in FIGURE 2 taking the counterweight with it so that the buoyancy of the float is increased. The float however, continues to move downwardly until it engages the lower stop screw, and commences to rise only when the counterweights have moved far enough to increase its buoyancy to a value above that at which it is just supported by the liquid. During its upward movement, as it again passes through its mean position, the float again causes the pressure differential across the valve spool 103 to be reversed, with consequent reversal of the pressure differential across the piston and reversal of the piston movement. Thus the changes in buoyancy of the float due to the movement of the counterweight are delayed until after it has passed its mean position, the said float always passing through the mean position with a degree of buoyancy such that it is still unbalanced in a direction to cause movement in the instant direction to continue, and cannot take up a "dead centre" position in which the valve spool and the piston are not subjected to any pressure differential. The float 57 therefore always oscillates between extreme positions governed by the stop screws 79.

Since the oscillation of the float 57 depends on changes in its buoyancy, the changes necessary to produce the oscillation depend on the density of the liquid in which it oscillates, and, assuming a fall in the density of the liquid, the counterweights 71 have to move further to the right to give a corresponding upward force. Consequently the counterweights, and the piston 45 reciprocate about a mean position which varies with the density of the liquid.

As described above, the piston 45 comprises an outer member 46 carrying the rack 55, and an inner member 50 to which the arm 67 and the counterweight 71 are connected. The inner member 50 is freely movable between stops 51 and 52 on the outer member 46, its movement between the stops being less than the total movement of the said inner member. The outer member 46 therefore moves through a smaller stroke than the inner member 50, allowing the counterweights to move through a substantial distance and, for a given weight, to produce a relatively large effect on the buoyancy of the float, whilst the movement imparted to the speed-changing member of the variable speed mechanism through the rack 55 and pinion 56 is relatively small. Nevertheless, the outer piston member 46 moves about a mean position which changes with the mean position of the inner piston member 50, so that the mean ratio of the variable speed mechanism varies with the liquid density, and the weight measuring indicator 31 is driven at a speed which varies with the density of the liquid.

I claim:

1. In a liquid metering device of the type having a rotary member driven by the flow of liquid through the meter and connected by driving means to an indicator, a float mounted in a chamber having an inlet and outlet through which a proportion of the liquid passing through the meter flows, a piston movable to and fro responsive to movement of the float by liquid pressure acting on the piston, a counterweight carried by the piston and reciprocal with respect thereto connected to the float to vary its buoyancy, and a ratio changing member of a continuously variable change speed device included in said driving means connected to said piston for varying the velocity readings of said indicator in accordance with changes of density of liquid passing through the meter, the improvement comprising the addition to said metering device of a reciprocable pilot valve, hydraulic passages connecting opposite ends of said pilot valve to both said liquid inlet and outlet of the float chamber, means in said passages responsive to movements of said float to hydraulically apply a pressure differential to said pilot valve, and hydraulic means connecting said pilot valve to opposite ends of said piston whereby the control of pressure of liquid flowing to opposite ends of the piston is effected by movements of said pilot valve.

2. A liquid metering device according to claim 1 wherein said means responsive to float movements is arranged simultaneously to increase the pressure on one side of the pilot valve and reduce the pressure on the other side of the pilot valve.

3. A liquid metering device according to claim 2, wherein the pilot valve is a slide valve comprising a spool slidable in a valve bore.

4. A liquid metering device according to claim 1, wherein the piston comprises relatively movable inner and outer members, the inner member moving with the float counterweight and the outer member being connected to the ratio-changing member of the continuously variable change speed device, stop means being provided to limit the relative movement of the two piston members.

5. A liquid metering device according to claim 4, wherein stop means are provided to limit movement of the outer member of the piston.

References Cited in the file of this patent

UNITED STATES PATENTS 2,031,852   Poillot _____ Feb. 25, 1936

FOREIGN PATENTS 662,037   Germany _____ July 2, 1938